United States Patent [19]

Unger

[11] Patent Number: 5,108,797
[45] Date of Patent: Apr. 28, 1992

[54] METHOD AND APPARATUS FOR MANUFACTURING FIBRE-REINFORCING MATERIAL

[75] Inventor: Michael Unger, Porvoo, Finland

[73] Assignee: Neste Oy, Finland

[21] Appl. No.: 514,125

[22] Filed: Apr. 25, 1990

[30] Foreign Application Priority Data

May 10, 1989 [FI] Finland ................................ 892266

[51] Int. Cl.$^5$ .............................................. B05D 3/02
[52] U.S. Cl. .............................. 427/389.8; 427/389.9; 427/434.5; 427/398.1
[58] Field of Search ............... 427/389.9, 434.5, 389.7, 427/420, 240, 326, 369, 358, 355, 389.8, 398.1

[56] References Cited

U.S. PATENT DOCUMENTS

| | | | |
|---|---|---|---|
| 2,611,717 | 9/1952 | Sooy et al. ........................ | 427/326 |
| 3,941,901 | 3/1976 | Harsch ............................. | 427/108 |
| 3,941,902 | 3/1976 | Wennerblom et al. ............. | 427/326 |
| 4,804,509 | 2/1989 | Angell, Jr. ........................ | 427/211 |
| 4,828,779 | 5/1989 | Hiraki et al. ..................... | 264/171 |
| 5,002,712 | 3/1991 | Goldmann et al. ................ | 427/358 |

OTHER PUBLICATIONS

*Textbook of Polymer Science*, p. 497 F. Billmeyer, Jr., 1971

Primary Examiner—Michael Lusignan
Assistant Examiner—D. L. Dudash
Attorney, Agent, or Firm—Steinberg & Raskin

[57] ABSTRACT

A method is disclosed for impregnating fibre bundles with molten or liquid resin (24, 29) in manufacturing a fibre-reinforced material, which material comprises fibre bundle or bundled groups of fibres, wherein each fibre is surrounded by matrix resin, by impregnating a continuous web (10, 10a) of one or more fibre bundles with molten or liquid resin (24, 29) and solidifying said resin by cooling or chemical reaction. Before said impregnation the molten or liquid resin material (29) is made subject to shear forces by bringing it to flow between two closely nearby surfaces (26, 27) which are in moving relationship into each other.

6 Claims, 2 Drawing Sheets

METHOD AND APPARATUS FOR MANUFACTURING FIBRE-REINFORCING MATERIAL

BACKGROUND OF THE INVENTION

Reference is made to Applicant's two commonly assigned applications filed simultaneously herewith corresponding to Finnish applications FI 892264 AND FI 892265 and having the same title as this application.

The present invention concerns a method and apparatus for manufacturing a fibre-reinforced material. Specifically the present invention concerns a method and apparatus for manufacturing fibre-reinforced material, which is formed by reinforcing a fibre bundle or bundles bonded with a matrix forming resin material in such a way that the individual fibres are surrounded by resin material.

The main problem in the manufacture of products of this kind is the high viscosity of some matrix forming materials. Because the individual fibres in the fibre bundles are very closely near to each other, it is thereby difficult for the resin material to penetrate into the fibre bundle to surround all individual fibres. However, such penetration is necessary in view of the desired properties of the product, such as strength, stiffness, chemical resistance etc.

Many methods have been tried to solve the problem. In one solution fibre bundles are transferred through a so-called cross-head die, in which molten or liquid resin is penetrated into the fibre bundles moving through the die. In the so-called powder method a web of fibre bundles is transferred through a bed of thermoplastic resin particles, whereby the fibre bundles carries along resin particles, which at a later stage are melted. Known also are solvent methods in which fiber bundles are impregnated with resins dissolved in a liquid medium.

The cross-head die method has proven to be ineffective in the impregnation of fibre bundles with thermoplastic resin because all individual fibres will not be surrounded by resin material. Powder methods necessitate a multiplicity of processing stages which are difficult to synchronize, are expensive to purchase and operate while damaging the reinforcement. In solvent methods a drying process is required, which is expensive, causes environmental problems, is time-consuming and limits the production rate. Furthermore the quality of the product is low due to voids left after the removal of solvents.

SUMMARY OF THE INVENTION

The present invention provides a method and apparatus for impregnating reinforcing fibres in the form of fibre bundles so that individual fibres are surrounded by bonding resin. The invention is based on the known phenomena that some pseudoplastic materials being made when subjected to shear stresses experience a decrease in viscosity. This phenomena, known as shear thinning, is common for various emulsions, dispersions, suspensions and other materials including thermoplastic resins and solutions of thermoset resins. The tendency for shear thinning response can be altered with the level of shear stress applied to the material. At low stresses a small degree of thinning is achieved, but at intermediate shear stresses the shear thinning response increases dramatically, while at very high shear stresses the degree of thinning reverts to lower levels as the material approaches minimum viscosity.

A typical range of viscosity for thermoplastic resin melts is $10^2-10^6$ PaS and for thermoset resin solution 100-5000 PaS. In the impregnation of reinforcing fibres a range of 1-10 PaS is ideal, a common magnitude is $10^2$ PaS and in some cases $10^3$ PaS can be acceptable. Typical shear rate ranges for polymer melts and solutions are $10^{-1}-10^6$ 1/S and range of maximum response can b $10^0-10^4$ 1/S.

The method according to the invention comprises the step of impregnating fibre bundles with molten or liquid resin in manufacturing a fibre-reinforced material, which material comprises a fibre bundle or bundled groups of fibres, wherein each fibre is surrounded by matrix resin, by impregnating a continuous web of one or more fibre bundles with molten or liquid resin and solidifying said resin by cooling or chemical reaction. The invention is characterized in that before said impregnation the molten or liquid resin is made subject to shear forces by bringing it to flow between closely proximate surfaces which are in moving relationship relative to each other.

According to one embodiment of the method of the invention one of the surfaces, between which the molten or liquid resin material is inserted to flow, is a stationary surface and the other surface is a moving surface. However both surfaces can be moving surfaces as well.

According to another embodiment of the method of the invention said surfaces are surfaces of cylindrical or annular elements, between which the resin to be impregnated flows and is thus made subject to shear forces decreasing viscosity.

With the method of the invention it is possible to manufacture any fibre-reinforced material, in which the fibres are in the form of bundles. The fibres can be any kind of fibres bondable by a matrix resin. Such products are for example fibre-reinforced granules for injection molding or other processes, prepregs or preimpregnated materials for additional processes such as extrusion, filament winding, tape laying etc.

Suitable fibres for the invention are glass fibres, carbon fibres and aramid fibres. Most common fibre materials are glass fibre products in the form of bundles, which can be used as single bundles or also in the form of woven products, for example as glass fibre rovings. Typically glass fibre bundles contain thousands of individual fibres with a diameter of 10-17 μm.

The resin material to be used for bonding fibre-reinforced products can be a thermoplastic resin, which is impregnated into fibre bundles as melt, or a thermosetting resin, which will be solidified after impregnation with heat or chemical reaction.

Suitable thermoplastic resins are among others olefine homogeneous polymers and copolymers, vinyl chloride homogeneous polymers and copolymers, polyethylene terephtalate, acrylonitrile polymers and copolymers, polyamides or copolyamides, thermoplastic polymers or formaldehyde, polycarbonate, polysulphonate, polysulphone and mixtures of two or more of the polymers above or any other thermoplastics which show decreased viscosity by shearing action.

The invention concerns also an apparatus for impregnating reinforcing fibre bundles with molten or liquid resin in manufacturing fibre-reinforced material, which material comprises a fibre bundle or bundled groups of fibres, wherein each fibre is surrounded by matrix resin.

The apparatus according to the invention is characterized in that it comprises means for subjecting the matrix resin to shear forces before said impregnation into said fibre bundles, which means comprise two closely nearby surfaces being in moving relationship with each other, between which surfaces said molten or liquid resin material is forced to flow and thus made subject to these shear forces, and means for bringing said fibre bundles into contact with said resin material having been subjected to shear forces for impregnating it with said resin material.

According to an advantageous embodiment of the apparatus according to the invention, one or both of the surfaces are moving surfaces.

According to an advantageous embodiment of the apparatus according to the invention said surfaces are surfaces of cylindrical elements.

According to another advantageous embodiment of the apparatus according to the invention said surfaces are planar surfaces. The planar surfaces can for instance consist of two planar discs, which are close to each other and rotate in different directions between which the molten or liquid resin is led.

According to another advantageous embodiment of the apparatus according to the invention is formed an annular space between two cylindrical surfaces, whereby one or both of the surfaces can be a rotating surface.

According to yet another advantageous embodiment of the apparatus according to the invention said means for bringing said fibre bundles into contact with said molten or liquid resin material having been subject to shear forces comprise one or more feed channels, which are in connection with said annular space.

According to still another advantageous embodiment of the apparatus according to the invention said feed channels having circular, rectangular or other cross-sections.

According to an advantageous embodiment of the apparatus according to the invention said channels are one or more radial slits cut into the wall of an impregnation head enclosing said annular space.

According to an advantageous embodiment of the apparatus according to the invention said impregnation head is connected to the outlet of an extruder.

According to an advantageous embodiment of the apparatus according to the invention the outer surface of the impregnation head is curved or planar in the area of the impregnation.

BRIEF DESCRIPTION OF THE DRAWINGS

The invention will be further illustrated but not limited by referring to the enclosed Figures, in which.

DESCRIPTION OF THE PREFERRED EMBODIMENTS

Figure 1:
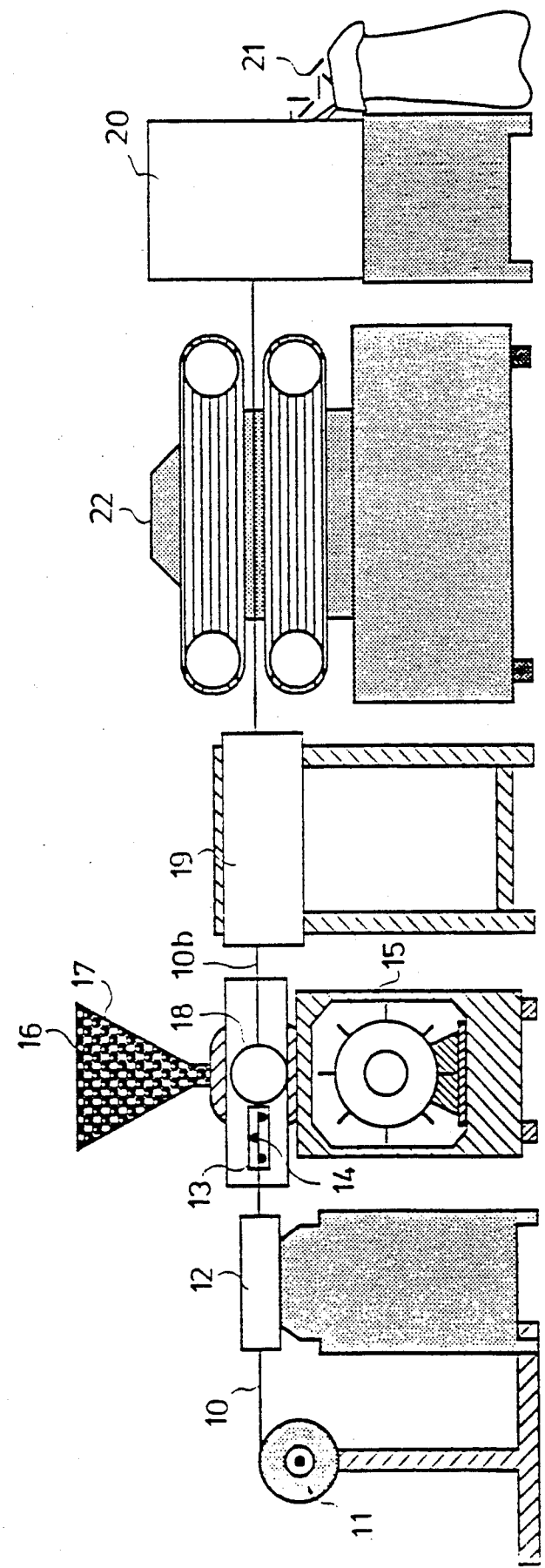
FIG. 1 is an elevational view, partly in section, of an apparatus according to the invention applied for manufacturing continuously fibre-reinforced thermoplastic granules.

In FIG. 1 a web 10 of glass fibre bundles is supplied from a drum 11 through a preheating chamber 12 and a spreading device 13 into an impregnation head 18. In the spreading device 13 the web 10 is transported over and under a set of rolls 14, so that the fibre web runs in an alternating way over and under the rolls. This spreads the individual fibres in the bundles and facilitates the impregnation in the impregnation stage. However, it shall be pointed out that the spreading device 13 is not necessary and does not form a part of the invention. The impregnation head 18 is connected to an extruder 15, in which the resin material to be impregnated is fed through a hopper 17. In the extruder 15 the resin is melted and is formed so that it can be fed to the impregnation head 18 according to the invention.

The resin impregnated band or web 10b of fibre bundles is then transferred to a cooling unit 19, where the molten resin is solidified by cooling. The solidifying can also take place by chemical reaction with or without said cooling.

From the cooling unit 19 the resin impregnated and solidified fibre bundles are then transferred to a chopper 20, which cuts the impregnated web to pieces 21 of proper length, which are ready for packing or use for manufacture of the products. With the method and the apparatus of the invention, it is naturally possible to manufacture also continuously fibre-reinforced products which in that case are chopped in desired lengths every time or they are left unchopped.

The transportation of the fibre bundle web 10 through the apparatus in FIG. 1 can be carried out by any suitable pulling device. A belt-driven pulling device 22 is schematically illustrated in FIG. 1.

Figure 2:
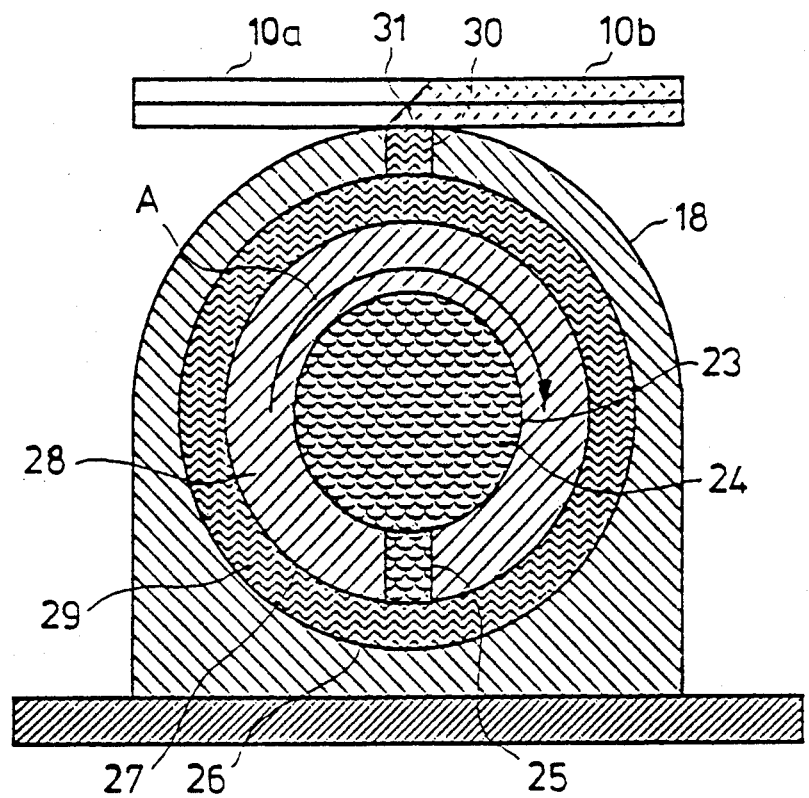
FIGS. 2 and 3 are schematic figures of an apparatus for impregnating a web of glass fibre bundles with matrix resin according to the invention.

FIG. 2 describes a preferred embodiment of the impregnation head 18 in FIG. 1. Inside the impregnation head 18 there is a feed cavity 23, through which molten unsheared resin material is fed from an extruder 15. From a cavity 23 the resin is fed through a port 25 into an annular space between two cylindrical surfaces 26 and 27. In this embodiment the outer surface 26 is a stationary surface and the inner surface 27 is a moving surface. This moving surface 27 is formed by the outer surface of a rotating annulus 28, which rotates into the direction indicated by an arrow A. The direction of rotation is not essential. In the annular space between the surfaces 26 and 27, which are in moving relationship to each other, the resin material 29 is made subject to shearing action, which decreases its viscosity.

The sheared resin material between the surfaces 26 and 27 is then discharged through a feed channel 30, which feeds the sheared resin to the impregnation area 31. The fibre bundle web 10a is transferred past the impregnation area 31 where the molten resin with decreased viscosity penetrates the fibre bundles so thoroughly that each fibre will be surrounded by resin material. The impregnated fibre bundle web 10b is then transferred to the cooling unit 18 described in FIG. 1.

Figure 3:
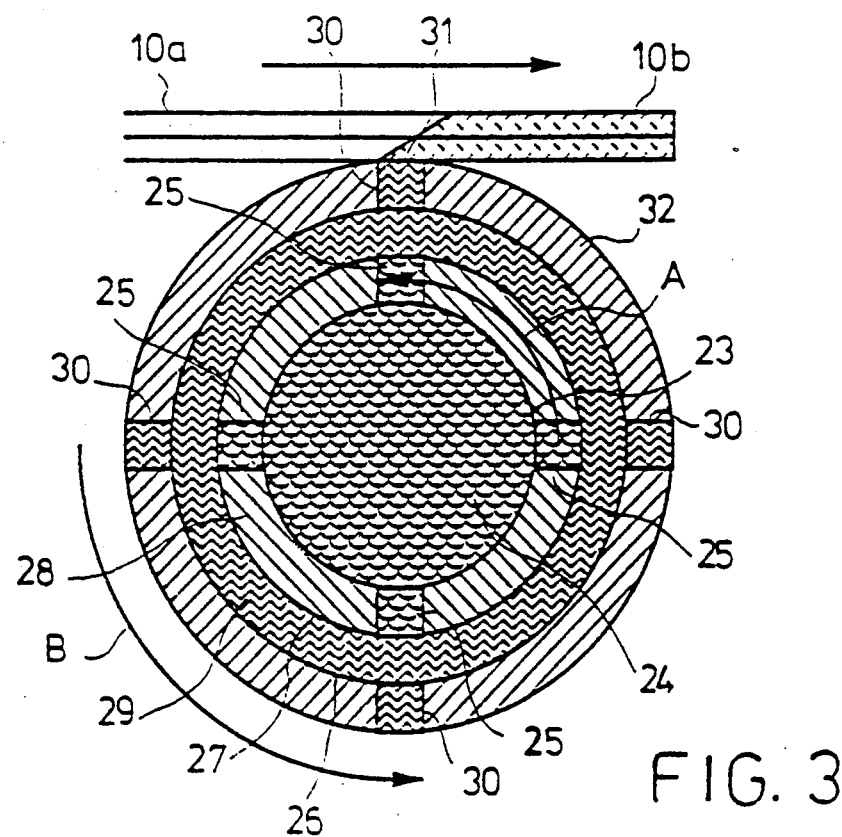

The shearing action lowering viscosity in FIG. 2 takes place between surfaces, one of which is a stationary surface and the other one is a moving surface. However it is clear that the other surface 26 could be a rotating cylindrical surface rotating in an opposite direction to that of the surface 27. In FIG. 3 such an embodiment is described. The apparatus according to FIG. 3 is similar to the one of FIG. 2, except that the shearing space is formed between two moving surfaces 27 and 26. The surface 26 is in this case the inner surface of an annulus 32 rotating in an opposite direction B from that of the annulus 28. This means more efficient shearing action.

It is evident from the above description that it is possible to use more than one annular shearing space sequentially. Furthermore, it is clear that the resin material coming into the impregnation head 18 in FIGS. 1-3 can be pretreated by other methods that initially lower its viscosity, for example by shearing action due to flow in capillary tubes.

Although the invention has been described above as applied to the impregnation of a moving fibre bundle web, it is evident that the fibre bundle web can be stationary and the impregnation head can be arranged to be movable. The function of the invention will be the same in both cases. Also, it is possible to use two or more impregnation heads according to the invention and these impregnation heads can be on the same or different sides of the fibre bundle web to be impregnated.

What is claimed is:

1. A method for impregnating fibre bundles with molten or liquid resin during the manufacture of a fibre-reinforced material, said material comprising a fibre bundle or bundles groups of fibres, each fibre being surrounded by matrix resin, said method comprising the steps of:

impregnating a continuous web of one or more fibre bundles with a quantity of said molten or liquid resin;

before said impregnating step causing said quantity of molten or liquid resin to flow into an annular space between an inner cylindrical surface and an outer cylindrical surface, said inner cylindrical surface and said outer cylindrical surface being closely proximate and in a moving relationship relative to each other such that shear forces are imparted to said molten or liquid resin and the viscosity of said molten or liquid resin is decreased, said molten or liquid resin being impregnated into said fibre bundles in its state of reduced viscosity; and solidifying said molten or liquid resin by cooling or chemical reaction.

2. The method of claim 1, wherein said matrix resin comprise a thermoplastic material.

3. The method of claim 2, wherein said thermoplastic material is selected from the group consisting of olefine homogeneous polymers and copolymers, vinyl chloride homogeneous polymers and copolymers, polyethylene terephthalate, acrylonitrile polymers and copolymers, polyamides or copolyamides, thermoplastic polymers of formaldehyde, polycarbonate, polysulphone and mixtures of two or more of said polymers and copolymers.

4. The method of claim 1, wherein one of said surfaces is a stationary surface and the other surface is a moving surface.

5. The method of claim 1, wherein both of said surfaces are moving surfaces.

6. A method for impregnating fibre bundles with molten or liquid resin during the manufacture of a fibre-reinforced material, said material comprising a fibre bundle or bundled groups of fibres, each fibre being surrounded by matrix resin, said method comprising the steps of:

causing a quantity of resin to flow into a space between two closely proximate surfaces which are in a moving relationship relative to each other such that shear forces are imparted to said resin and the viscosity of said resin is decreased;

immediately thereafter feeding said sheared resin to an impregnation area and impregnating a continuous web of one or more fibre bundles with said sheared resin having a decreased viscosity such that said resin penetrates said fibre bundles and surrounds each fibre; and solidifying said resin by cooling or chemical reaction.

* * * * *